United States Patent [19]

Schmaus

[11] 4,015,478
[45] Apr. 5, 1977

[54] DIRECT-ACTING PRESSURE SENSOR

[76] Inventor: Siegfried H. A. Schmaus, 806 Powder Mill Lane Penfield Downs,, Philadelphia, Pa. 19151

[22] Filed: Apr. 27, 1976

[21] Appl. No.: 680,701

Related U.S. Application Data

[62] Division of Ser. No. 632,920, Nov. 18, 1975, Pat. No. 3,986,400.

[52] U.S. Cl. .................................. 73/418; 73/409
[51] Int. Cl.² ........................................ G01L 7/04
[58] Field of Search ............... 73/418, 411–417, 73/409

[56] References Cited
UNITED STATES PATENTS 3,732,733  5/1973  Schmaus .......................... 73/418

Primary Examiner—Donald O. Woodiel

[57] ABSTRACT

A direct-acting pressure sensor operable in the low-pressure range and including a sub-assembly constituted by inner and outer concentrically-arranged curved springs anchored at one end in a socket to define a pressure region therebetween, within which is disposed a flexible bladder forming an internal pressure chamber communicating with the socket, the springs being joined at their free end to form a tip whose travel is indicative of the pressure of fluid applied to the sensor through said socket. The bladder which is preferably fabricated of reinforced elastomeric material is bonded to the springs to avoid slide friction therebetween and thereby minimize hysteresis.

3 Claims, 7 Drawing Figures

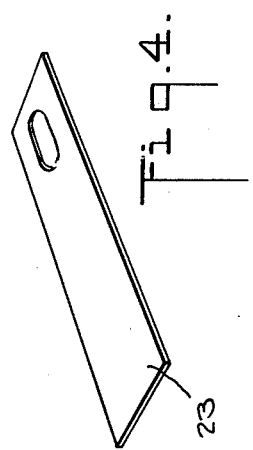
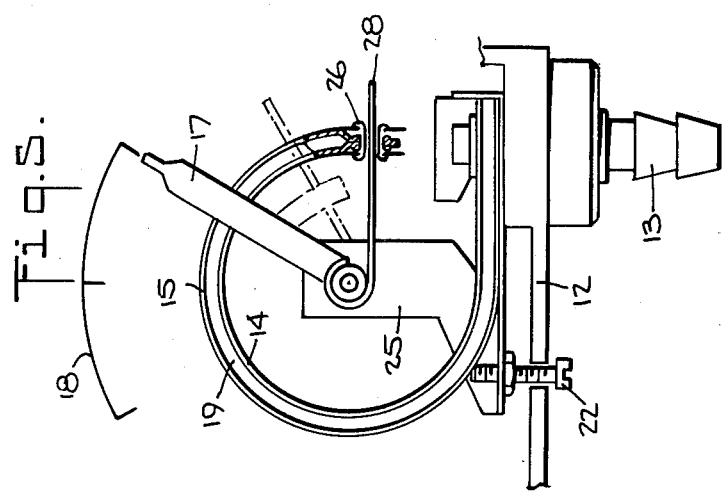
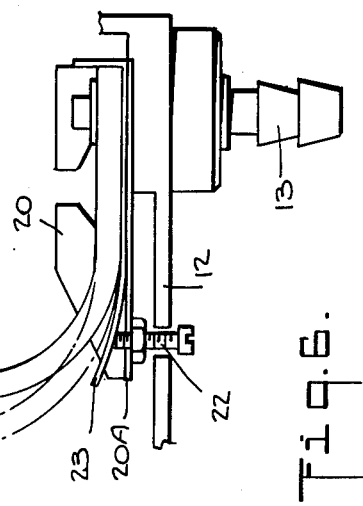
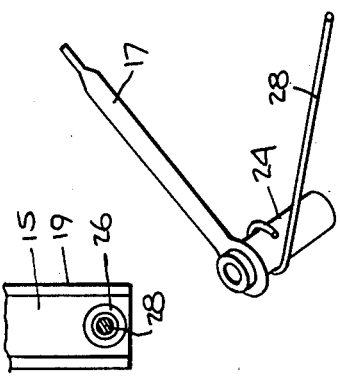
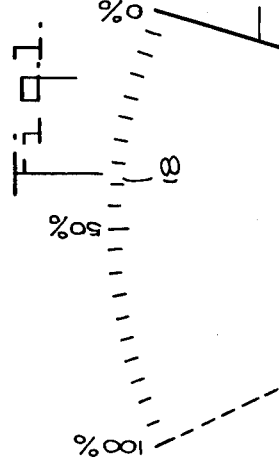
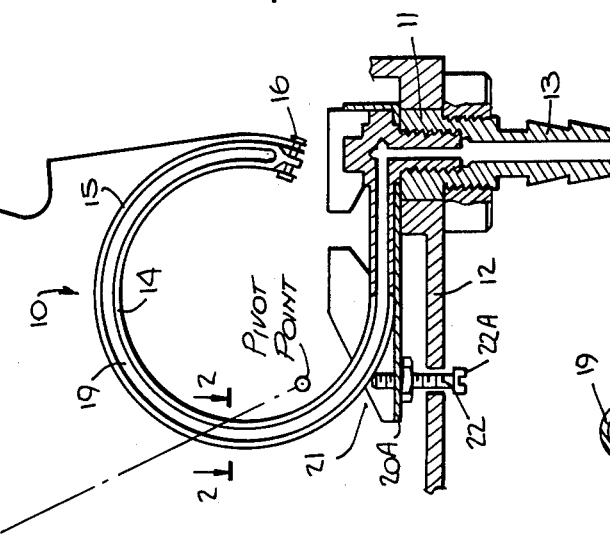

DIRECT-ACTING PRESSURE SENSOR

RELATED APPLICATION

This application is a division of the copending application Ser. No. 632,920 filed Nov. 18, 1975 entitled "Pressure Sensor with Range Adjustment", now U.S. Pat. No. 3,986,400.

BACKGROUND OF INVENTION

The invention relates generally to direct-acting pressure gauges, and more particularly to a pressure sensor which is operable in the low-pressure range and which includes means for adjusting the range thereof.

Measurement of absolute pressure, gauge pressure, vacuum and draft pressure, and differential pressure, is carried out by two primary types of pressure-sensitive elements, the first being the liquid column in which the height and density of the liquid are utilized to measure pressure, and the second being the elastic pressure device. The sole concern of the present invention is with elastic pressure elements which are designed to follow the physical law that within an elastic limit, stress is proportional to strain; hence deflection is proportional to applied pressure.

The Bourdon tube, because of its stability, simplicity and high pointer torque, is widely used as a pressure or vacuum indicator. The operation of the Bourdon tube is based on the principle that an elastic tube having an internal cross-section that is not a perfect circle, if bent or distorted, has the property of changing its shape with internal pressure variations. This internal pressure causes the cross-sectional form to become more circular, giving rise to a motion of the closed end or tip of the tube if the open end is rigidly fixed, this motion being usually referred to as "tip travel."

While Bourdon tubes are capable of operating within various pressure ranges running as high as 100,000 psi, in no instance is it possible as a practical matter, to operate such tubes below 12 or 15 psi. Hence, despite the advantages of Bourdon tubes, they are not effective as gauges in the low-pressure range and it has heretofore been necessary to employ costly and relatively fragile bellows or diaphragm-sensing elements to effect measurement in this range.

My prior U.S. Pat. No. 3,732,733 discloses a low-cost pressure sensor capable of accurately gauging pressures in the low pressure range. The sensor disclosed in this patent includes two curved flat metal springs in a concentric arrangement wherein the springs are cantilevered from a socket, the free end of the springs being joined together at a tip from which a pointer extends. The springs enclose a flexible bladder having an internal chamber which communicates with the socket, whereby fluid fed through the socket into this chamber acts to expand the bladder and causes the springs to uncurl, thereby moving the tip and the pointer attached thereto as a function of the applied pressure.

In a conventional Bourdon tube pressure gauge, the relationship between applied fluid pressure and tip travel is such that it takes a large pressure change to effect a relatively small tip movement. Consequently, commercial forms of such gauges include gear works or linkages to mechanically amplify the tip travel. The friction introduced by mechanical amplifiers usually makes it necessary to tap the gauge to cause it to register. Such tapping is unnecessary with a sensor of the type disclosed in my prior patent, for no mechanical amplifier is involved. The sensor is highly sensitive so that a small change in applied pressure produces a relatively large tip excursion.

Moreover, with this patented sensor, since there are no gears or linkages and the tip is directly coupled to the pointer, there is no problem of wear and the sensor has a high shock resistance as well as a long life expectancy.

In a commercial embodiment of a pressure sensor of the type covered by the above-noted patent, the pointer extending from the tip describes a true arc along a curved scale. The pointer motion is linear and can be adjusted by changing the active length of the two springs. This is done by means of factory calibration procedure in which a clip is attached at a selected position which determines the active length of the springs. By this expedient, it is possible to adjust the range of the sensor approximately 25%.

This factory testing and calibration procedure for adjusting the range of the sensor adds substantially to the cost of production. Moreover, once the sensor is enclosed in its case, range adjustment is no longer possible and should an adjustment be necessary in the field, this cannot be done.

Another drawback of the sensor disclosed in the above-noted patent is that since its bladder was unattached to the springs between which it was sandwiched, the sensor could not function as a negative pressure or vacuum gauge, for negative pressure would cause the bladder to collapse.

SUMMARY OF INVENTION

In view of the foregoing, it is the main object of this invention to provide a fluid pressure sensor adapted to accurately measure positive or negative pressure in a low pressure range.

More specifically, it is an object of this invention to provide a reliable and efficient pressure sensor whose operating range is adjustable from the exterior of the instrument whereby range adjustments may be made in the field and need not be made in the factory.

Also an object of the invention is to provide a sensor of the above type in which the pointer is coupled to the tip of the sensitive element through a lever whose effective length is adjustable from the exterior of the instrument to vary the operating range of the sensor.

Among the significant advantages of a sensor in accordance with the invention are compactness, for the sensor lends itself to edgewise mounting and permits scanned readings mounted in multiple, high shock resistance, high tip travel and high life expectancy.

Briefly stated, these objects are attained in a direct-acting pressure sensor having a sub-assembly constituted by inner and outer concentrically arranged curved springs anchored at one end in a socket to define a pressure region therebetween, within which is disposed a flexible bladder forming an internal pressure chamber communicating with the socket.

The springs are joined at their free end to form a tip whose travel is indicative of the pressure of fluid applied to the sensor through the socket, which pressure serves to deflect the springs. The range of the sensor is adjustable by means of a set screw adapted to engage the outer spring to shift the theoretical pivot point of the sub-assembly.

OUTLINE OF DRAWING

For a better understanding of the invention as well as other objects and further features thereof, reference is made to the following detailed description to be read in conjunction with the accompanying drawing, wherein:

FIG. 1 schematically illustrates a first preferred embodiment of a pressure sensor in accordance with the invention;

FIG. 2 is a transverse section taken through the sensitive element of the sensor in the plane indicated by line 2—2 in FIG. 1;

FIG. 3 is a schematic illustration of a second preferred embodiment of a pressure sensor in accordance with the invention;

FIG. 4 is a perspective view of the range adjustment spring included in the second embodiment;

FIG. 5 is a schematic showing of a third preferred embodiment of a pressure sensor according to the invention;

FIG. 6 shows the tip of the sensitive element of the third embodiment; and

FIG. 7 is a perspective of the pointer in the third embodiment.

DESCRIPTION OF INVENTION

First Embodiment

Referring now to FIGS. 1 and 2, there is shown a pressure sensor in accordance with the invention. The sensor includes a pressure-sensitive sub-assembly, generally designated by numeral 10, which is anchored on a socket 11 supported on the rear wall 12 of a frame. Socket 11 is coupled to a hose connector 13 projecting from rear wall 12, whereby fluid under pressure may be admitted into the sub-assembly.

Sub-assembly 10 is constituted by two flat springs 14 and 15, both having the same tapered width but differing in length so that the springs, which may be made of any suitable metal alloy of the types currently employed in bourdon tubes, have different spring characteristics or spring rates. Springs 14 and 15 may be of metallic or plastic material, both having a similar C-formation, the two springs being concentrically disposed and being anchored at one end in socket 11. At their free end, the springs are joined together by a hollow rivet 16 to form the tip of the pressure sensitive element. A bladder 19 communicating with socket 11 is interposed between springs 14 and 15, the free end thereof being connected to rivet 16 to which is attached a pointer 17 moving along a scale 18.

The springs are preferably fabricated of Ni-Span "C," which though relatively costly nevertheless effects overall economies in meeting certain production problems as compared to less expensive metals such as stainless steel, phosphor bronze, or beryllium copper. Ni-Span "C," when cold-worked and then heat-treated, has been found to have superior hysteresis and spring characteristics over long service, as well as good thermal stability over a temperature range of −40° F to +160° F.

Bladder 19 is preferably constituted by a reinforced elastomeric material so that the cross-sectional area of the bladder is constant and unaffected by pressure. The only effect of pressure on the bladder which is caused by the springs to initially assume a humped form is to try to straighten out the bladder against the tension of the springs. Preferably, the bladder is fabricated by coating a sleeve formed from woven yarns of Dacron (a polyester fiber made from polyethylene terephthalate), the sleeve being uniformly coated with silicone rubber. One end of the sleeve is sealed, the other end being open and communicating with the socket. The resultant bladder, while highly flexible, is non-dilatable, so that the internal surface area of the pressure chamber is unaffected by fluid pressure. The pressure chamber is uncompromised by spring requirements, it is free of aging and stiffness from −40° to +200° F and is unaffected by aqueous solutions, salts, mild acids and mild alkalies. Because the bladder is bonded to the springs, there is no slide friction therebetween and hysteresis is minimized.

In this fluid pressure sensor employing C-shaped springs, it is possible by selecting proper values for thickness and length to keep fibre stresses in these springs below 30% of the proportional elastic limit, except in higher pressure ranges where the spring thickness has to be thicker. A tapered flat cantilever spring is relatively simple to manufacture, for the stock for this material is readily available in sheet or strip form in cold worked condition.

The thickness of commercially available stock is highly uniform. Thus, Ni-Span "C" material can be purchased with ± 0.0001 inch tolerance at a premium price, thereby affording closer control in final calibration. The physical dimensions of the springs are readily controlled because they may be stamped or photo-etched. Because the springs are free of complicated bends, premature stress failure is avoided.

In contradistinction, a Bourdon tube pressure gauge, though simple in appearance, is a highly complex spring, and when internal pressure is applied, the flat faces of the tube bulge, giving rise to a high stress concentration at the two edge radii which join the flat faces of the tube. These two edge radii in a Bourdon tube are highly critical, whereas the equivalent radii in an elastomeric bladder in accordance with the invention are not at all critical. Indeed, a sensor of a given size in accordance with the invention is characterized by tip-travel which is approximately 10 times greater than that of a Bourdon tube gauge of the same size, so that motion amplification by a linkage or a geared movement is unnecessary. Consequently, the sensor is not subject to the wear, friction and instability during vibration and shock experienced with movements of the type used in conjunction with bourdon tubes.

Moreover, because of the spring-bladder structure of the sensor, it has a life expectancy which is extremely high compared with geared bourdon or other mechanical pressure gauges of comparable cost. Thus in an endurance test performed by applying 0 to 100% pressure to a sensor in accordance with the invention having a 0 to 15 psi range, the test was discontinued after 20 million cycles, even though the sensor was still functioning well, because this was far beyond the life expectancy of any other mechanical gauge.

The motion of the pointer is linear and for purposes of calibration, the range may be adjusted in the manner disclosed in my prior U.S. Pat. Nos. 3,732,733 and 3,603,153, or by changing the active length of the two springs by a clip attached thereto at a selected position during calibration. Also, as pointed out in these prior patents, the configuration of the springs is not limited to C-shapes and many other curved or coiled forms may be used.

The present invention is directed to the manner of adjusting the range after the instrument is encased to allow for variations in spring rate or in bladder characteristics normally encountered in practice.

In order to effect a change in the range of the instrument from the interior thereof, a bracket 20 is interposed between socket 11 and the pedestal on which it rests at rear wall 12, the bracket having an elongated shelf 20A which extends in a plane parallel to the rear wall. The shelf engages the end portion of the curved outer spring 15 and projects therebeyond to define an open shed 21. Threadably received in shelf 20A is a set screw 22, the lower portion of the screw shank passing through an opening in wall 12 and terminating in a head 22A which is outside the sensor frame and is thereafter accessible. The upper portion of the shank of set screw 22 extends through shed 21 and engages the outer spring 15.

Set screw 22 is axially adjustable so that it more or less biases the spring-bladder sub-assembly and thereby alters the range of the sensor to correct for variations in the spring rate or bladder. Because the outer spring is engaged at a single fixed position, the amount of range adjustment made possible by this embodiment is somewhat limited.

Second Embodiment

The second embodiment shown in FIGS. 3 and 4 is similar to the first embodiment illustrated in FIGS. 1 and 2, except that instead of having set screw 22 directly impinge on the outer spring 15, it engages a leaf spring 23 which is mounted on socket 11 and is interposed between the bracket shelf 20A and the outer spring, as a result of which the end of the set screw shank engages the leaf spring.

In its initial position, leaf spring 23 rests on shelf 20A, but as set screw 22 is advanced axially, it acts to flex the leaf spring upwardly so that the more the leaf spring is raised, the greater the portion thereof that is brought into surface abutment with the outer spring 15, thereby affecting the range of the sensor. That is to say, the more leaf spring 23 engages outer spring 15 of the sensitive element, the greater is the pressure required to uncoil the sensitive element and the higher the operating range of the sensor.

The degree to which engagement between the leaf spring and the inner spring is brought about is linear, hence the range adjustment is also linear.

Third Embodiment

In the first and second embodiments, the pointer 17 is directly attached to the tip of the pressure sensitive element, whereas in the third embodiment illustrated in FIGS. 5, 6 and 7, the pointer 17 is secured to the end of a bushing 24 which is mounted for rotation on a bracket plate 25.

The inner and outer springs 14 and 15 and the flattened end of the bladder 19 are interconnected at their free ends by an eyelet 26 having a hole therein. Secured to bushing 24 and extending therefrom is a stiff wire 28 which passes through the hole in eyelet 26 and is freely movable therein. This wire functions as a lever whose effective length is equal to the distance between the axis of rotation of the pointer and the eyelet. The longer the lever, the greater the movement thereof that is necessary to shift the pointer at a given distance. Thus the operating range of the sensor depends on the effective length of the lever.

In the third embodiment, the set screw arrangement is the same as in the first embodiment; hence as screw 22 is advanced against outer spring 15, it acts to push the sensitive element and to displace the position of eyelet 26 with respect to lever wire 28, thereby changing the effective length of the lever and the operating range of the instrument.

There is very little friction in the eyelet. This type of adjustment permits range adjustment without introducing any friction to the bearing point on the axis of bushing 24. This arrangement, therefore, provides a simple and effective means for adjusting range outside of the casing. If linearity is a problem, proper positioning of the pointer pivot point in relation to the tip travel can resolve this problem.

While there have been shown and described preferred embodiments of fluid pressure sensors in accordance with the invention, it will be appreciated that many changes and modifications may be made therein without, however, departing from the essential spirit thereof.

I claim:
1. A fluid pressure sensor comprising:
  A. inner and outer flat springs having similarly curved formations and maintained in concentric relation to define a pressure region therebetween;
  B. a fixed fluid input socket anchoring said springs at one end thereof, the free end of the springs being joined to form a tip whose travel is indicative of fluid pressure; and
  C. a flexible bladder occupying said region and having an internal chamber, the faces of said bladder engaging said springs and being bonded thereto avoid slide friction therebetween, thereby minimizing hysteresis, said internal chamber communicating with said fluid input socket whereby the pressure of fluid fed to said chamber through said socket applies a load on said springs producing deflection thereof whereby said tip is caused to travel.
2. A sensor as set forth in claim 1, wherein said bladder is formed by reinforced elastomeric material whereby said bladder is non-dilatable.
3. A sensor as set forth in claim 2, wherein said bladder is formed by a woven fabric sleeve of polyester yarns coated with silicone rubber.

* * * * *